US012789683B2

(12) United States Patent
Reith et al.

(10) Patent No.: US 12,789,683 B2
(45) Date of Patent: Nov. 10, 2026

(54) ASSEMBLY FOR A FIRST BACKREST AND A SECOND BACKREST OF A VEHICLE SEAT

(71) Applicant: FAURECIA Sièges d'Automobile, Nanterre (FR)

(72) Inventors: Carsten Reith, Niedernwöhren (DE); Abhijeet Pharate, Pune (IN); Marine Michaud, Paris (FR)

(73) Assignee: FAURECIA Sièges d'Automobile, Nanterre (FR)

( * ) Notice: Subject to any disclaimer, the term of this patent is extended or adjusted under 35 U.S.C. 154(b) by 340 days.

(21) Appl. No.: 18/402,001

(22) Filed: Jan. 2, 2024

(65) Prior Publication Data

US 2024/0217412 A1 Jul. 4, 2024

(30) Foreign Application Priority Data

Jan. 4, 2023 (FR) ....................................... 2300090

(51) Int. Cl.
*B60N 2/70* (2006.01)
*B60N 2/50* (2006.01)
*B60N 2/68* (2006.01)

(52) U.S. Cl.
CPC ................. *B60N 2/68* (2013.01); *B60N 2/50* (2013.01); *B60N 2/686* (2013.01); *B60N 2/7029* (2013.01)

(58) Field of Classification Search
CPC .... B60N 2/7029; B60N 2/7005; B60N 2/686; B60N 2/66
See application file for complete search history.

(56) References Cited

U.S. PATENT DOCUMENTS

| | | | | |
|---|---|---|---|---|
| 6,554,365 B2 * | 4/2003 | Karschin | ................ | B60N 2/986 297/216.13 |
| 7,874,616 B2 * | 1/2011 | D'Agostini | .............. | B60N 2/66 297/216.12 |
| 9,415,713 B2 * | 8/2016 | Line | ................... | B60N 2/02246 |
| 9,649,963 B2 * | 5/2017 | Line | ..................... | B60N 2/7005 |
| 9,694,723 B2 * | 7/2017 | Shimizu | ............... | B60N 2/4228 |
| 9,796,307 B2 * | 10/2017 | Awatani | ............... | B60N 2/6673 |

(Continued)

FOREIGN PATENT DOCUMENTS

WO WO-2023079243 A1 * 5/2023 ............. B60N 2/686

OTHER PUBLICATIONS

French Search Report for priority French Patent App. FR2300090 dated Oct. 6, 2023, 4 pages, No English Translation Available.

*Primary Examiner* — Timothy J Brindley
(74) *Attorney, Agent, or Firm* — Barnes & Thornburg LLP

(57) ABSTRACT

An assembly for a first backrest and a second backrest, the assembly comprising a first suspension system for attachment to a first frame and a second suspension system for attachment to a second frame, wherein:
- the first suspension system comprises a first main support, a first ancillary support and a first structural core to which the first main support and the first ancillary support are attached,
- the second suspension system comprises a second main support, a second ancillary support and a second structural core to which the second main support and the second ancillary support are attached,
- the second main support is geometrically identical to the first main support, and the second ancillary support geometrically differs from the first ancillary support.

8 Claims, 9 Drawing Sheets

(56) References Cited

U.S. PATENT DOCUMENTS

Figure 1:
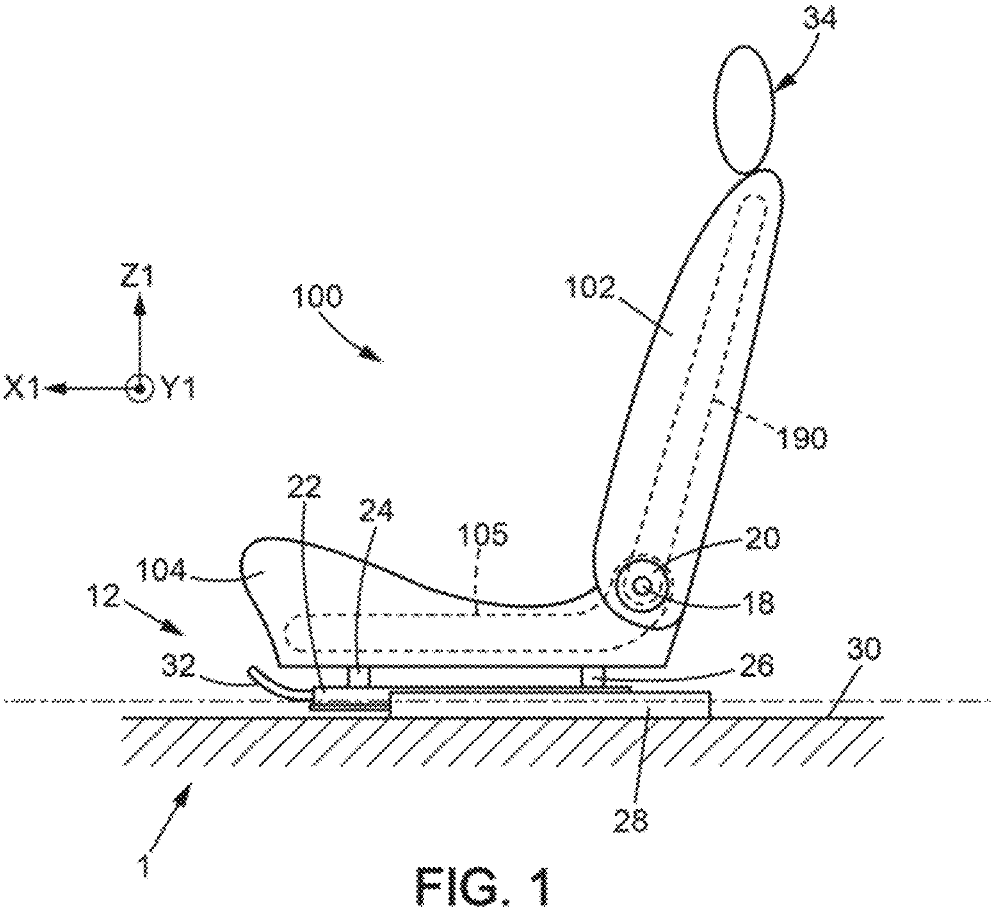

| | | | | |
|---|---|---|---|---|
| 9,834,166 | B1 * | 12/2017 | Line | B60N 2/6009 |
| 9,849,856 | B1 * | 12/2017 | Line | B60N 2/42745 |
| 9,884,574 | B2 * | 2/2018 | Mizoi | B60N 2/0284 |
| 9,889,773 | B2 * | 2/2018 | Line | B60N 2/68 |
| 10,166,894 | B2 * | 1/2019 | Line | B60N 2/686 |
| 10,272,800 | B2 * | 4/2019 | Whitmore | B60N 2/7035 |
| 10,279,714 | B2 * | 5/2019 | Line | B60N 2/62 |
| 10,688,945 | B2 * | 6/2020 | Jones | B60N 2/682 |
| 10,857,920 | B2 * | 12/2020 | Morrow | B60N 2/686 |
| 11,453,320 | B1 * | 9/2022 | Powell | B60N 2/803 |
| 11,654,806 | B2 * | 5/2023 | Ishihara | B60N 2/64<br>297/452.55 |
| 11,760,242 | B2 * | 9/2023 | Reith | B60N 2/72<br>297/394 |
| 12,208,716 | B2 * | 1/2025 | Line | B60N 2/682 |
| 2013/0320742 | A1 * | 12/2013 | Murolo | B60N 2/682<br>264/279 |
| 2015/0008716 | A1 * | 1/2015 | Dry | B60N 2/56<br>297/452.38 |
| 2020/0139867 | A1 | 5/2020 | Ceglarek | |
| 2024/0075858 | A1 * | 3/2024 | Ito | B60N 2/5657 |
| 2024/0217406 | A1 * | 7/2024 | Reith | B60N 2/7094 |
| 2024/0300395 | A1 * | 9/2024 | Mizoi | B60N 2/22 |

* cited by examiner

ASSEMBLY FOR A FIRST BACKREST AND A SECOND BACKREST OF A VEHICLE SEAT

PRIORITY CLAIM

This application claims priority to French Patent Application No. FR2300090, filed Jan. 4, 2023, which is expressly incorporated by reference herein.

BACKGROUND

The present disclosure relates to an assembly for a vehicle seat backrest, in particular for a motor vehicle.

SUMMARY

According to the present disclosure, an assembly for a first backrest and a second backrest of a vehicle seat, the assembly comprising a first suspension system intended to be attached to a first frame (of a backrest) and a second suspension system intended to be attached to a second frame (of a backrest), wherein:

the first suspension system comprises:

- a first main support, the first main support has a first main plate, the first main plate extends in a first elevation direction between a first upper main edge and a first lower main edge, the first main plate extends along a first transverse direction between a first main edge on the first side and a first main edge on the second side, the first transverse direction is perpendicular to the first elevation direction,
- a first ancillary support, the first ancillary support has a first ancillary plate, the first ancillary plate has a first central portion extending in the extension of the first main plate along the first elevation direction, the first central portion extends along the first elevation direction between a first upper central edge and a first lower central edge, the first lower central edge extends opposite the first upper main edge, and
- a first structural core extending along the first elevation direction, the first main support is attached to the first structural core and the first ancillary support is attached to the first structural core, the second suspension system comprises:

- a second main support, the second main support has a second main plate, the second main plate extends in a second elevation direction between a second upper main edge and a second lower main edge, the second main plate extends along a second transverse direction between a second main edge on the first side and a second main edge on the second side, the second transverse direction is perpendicular to the second elevation direction,
- a second ancillary support, the second ancillary support has a second ancillary plate, the second ancillary plate has a second central portion extending in the extension of the second main plate along the second elevation direction, the second central portion extends along the second elevation direction between a second upper central edge and a second lower central edge, the second lower central edge extends opposite the second upper main edge, and
- a second structural core extending along the second elevation direction, the second main support is attached to the second structural core and the second ancillary support is attached to the second structural core, wherein assembly:

- the second main support is geometrically identical to the first main support, and
- the second ancillary support geometrically differs from the first ancillary support.

In illustrative embodiments, the structural core performs a suspension function. Multiple different seat models can be produced, the main support of these seat models having been made in the same mold or at least in molds having molding cavities of identical dimensions to within manufacturing tolerances. Therefore, savings can be made in the development and the production of the mold, the manufacturing of the main supports, and the management of the elements constituting the backrest.

Considering manufacturing tolerances, a second main support will be considered geometrically identical to the first main support if each of its dimensions differs from those of the first support by less than 1%.

It is specified that, in accordance with the usual definition, the term "plate" means a flat, thin and rigid piece. Therefore, in particular inflatable elements are not considered to form a plate. However, the first backrest and/or the second backrest may comprise one or more inflatable element(s).

In illustrative embodiments, the second main support is preferably technically identical to the first main support.

In illustrative embodiments, not only is the second main support geometrically identical to the first main support, but also the first main support and the second main support are made of the same material. The second main support may not be totally identical to the first main support; aesthetic differences may exist, for example a color difference due to different dyes or the affixing of a manufacturing date or the like.

Given manufacturing tolerances, a second main support geometrically identical to the first main support will be considered technically identical to the first main support if the contents of the elements constituting the material of the second main support differ by less than 1% by weight of the elements constituting the material of the first main support.

In illustrative embodiments, the first ancillary plate further has a first lateral portion on the first side, the first lateral portion on the first side extends in the first transverse direction from the first central portion to a first outer lateral edge on the first side, located beyond the first main edge on the first side (preferably at least 5 centimeters).

In illustrative embodiments, the first ancillary support makes it possible to adapt to the differences between the first backrest and the second backrest not only in a central part, but also in a lateral part.

In illustrative embodiments, the first lateral portion on the first side extends in the first elevation direction to a first bottom edge on the first side, the first bottom central edge being located between the first upper central edge and the first bottom edge on the first side along the first elevation direction, and the first lateral portion on the first side has an inner edge on the first side extending opposite the first main edge on the first side.

It is thus possible to produce a wide variety of different backrests having geometrically identical main supports.

In illustrative embodiments, the first ancillary support extends along the first elevation direction over a first height between the first upper central edge and (a first lower ancillary edge to which the first lower edge on the first side belongs), the second ancillary support extends along the second elevation direction over a second height from the second upper central edge, and the first height is (strictly) greater than the second height.

Being able to vary the height of the ancillary support makes it possible to adapt effectively to the specific features of each backrest.

In illustrative embodiments, the first height is preferably greater than the second height by at least 5 centimeters, preferably by at least 10 centimeters.

In various embodiments of the assembly according to the disclosure, one and/or more of the following arrangements may also be used:

- the first suspension system has a plane of symmetry extending perpendicular to the first transverse direction;
- the second structural core is geometrically identical to the first structural core;
- the second structural core is technically identical to the first structural core;
- the first structural core comprises a first wire and the second structural core comprises a second wire;
- the first wire has a first section comprised between 10 square millimeters and 100 square millimeters and the second wire having a second section comprised between 10 square millimeters and 100 square millimeters;
- the first wire is made of steel and the second wire is made of steel;
- the first structural core comprises a first wire portion on the first side and a first wire portion on the second side, the first wire portion on the second side and the first wire portion on the first side are separated from each other along the first transverse direction by a first distance of at least 20 centimeters, the first main support is attached to the first wire portion on the first side and the first wire portion on the second side, the second structural core comprises a second wire portion on the first side and a second wire portion on the second side, the second wire portion on the second side and the second wire portion on the first side are distant from each other along the second transverse direction by a second distance of at least 20 centimeters, and the second main support is attached to the second side wire portion on the first side and the second wire portion on the second side;
- the assembly comprises a first backrest and a second backrest, the first backrest comprises the first frame and the first suspension system, the second backrest comprises the second frame and the second suspension system, the first structural core extends along the first elevation direction between a first upper structural end and a first lower structural end, the first structural core is attached to the first frame at the first upper structural end and the first lower structural end, and the second structural core extends along the second elevation direction between a second upper structural end and a second lower structural end, the second structural core is attached to the second frame at the second upper structural end and at the second lower structural end;
- the second frame is geometrically identical to the first frame;
- the first main support, the first ancillary support, the second main support, the second ancillary support are made of plastic material;
- the assembly further comprises a first padding, a second padding, a first cover and a second cover, the first padding is arranged between the first main support and the first cover, and the second padding is arranged between the second main support and the second cover.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

Figure 2:
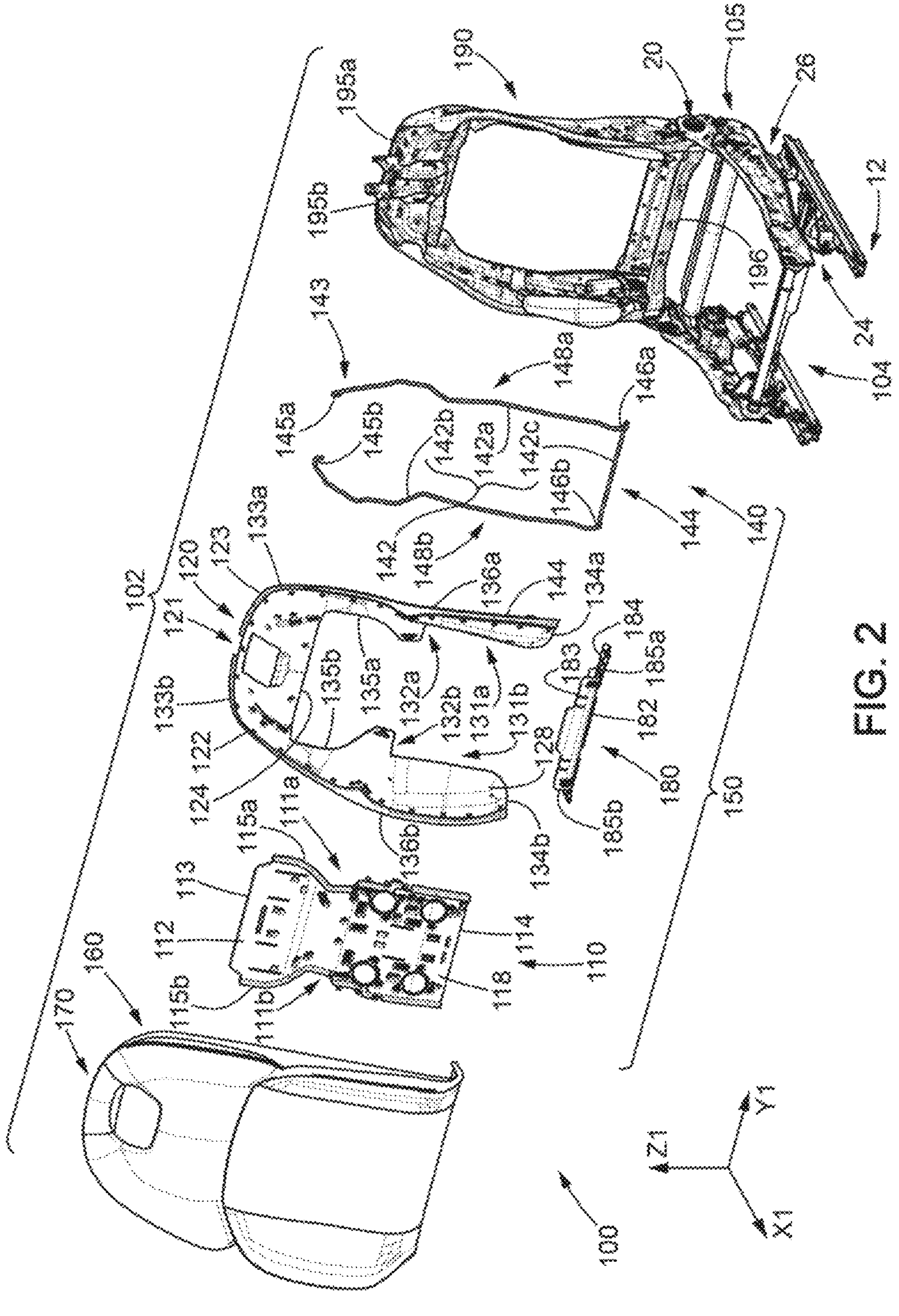
Figure 3:
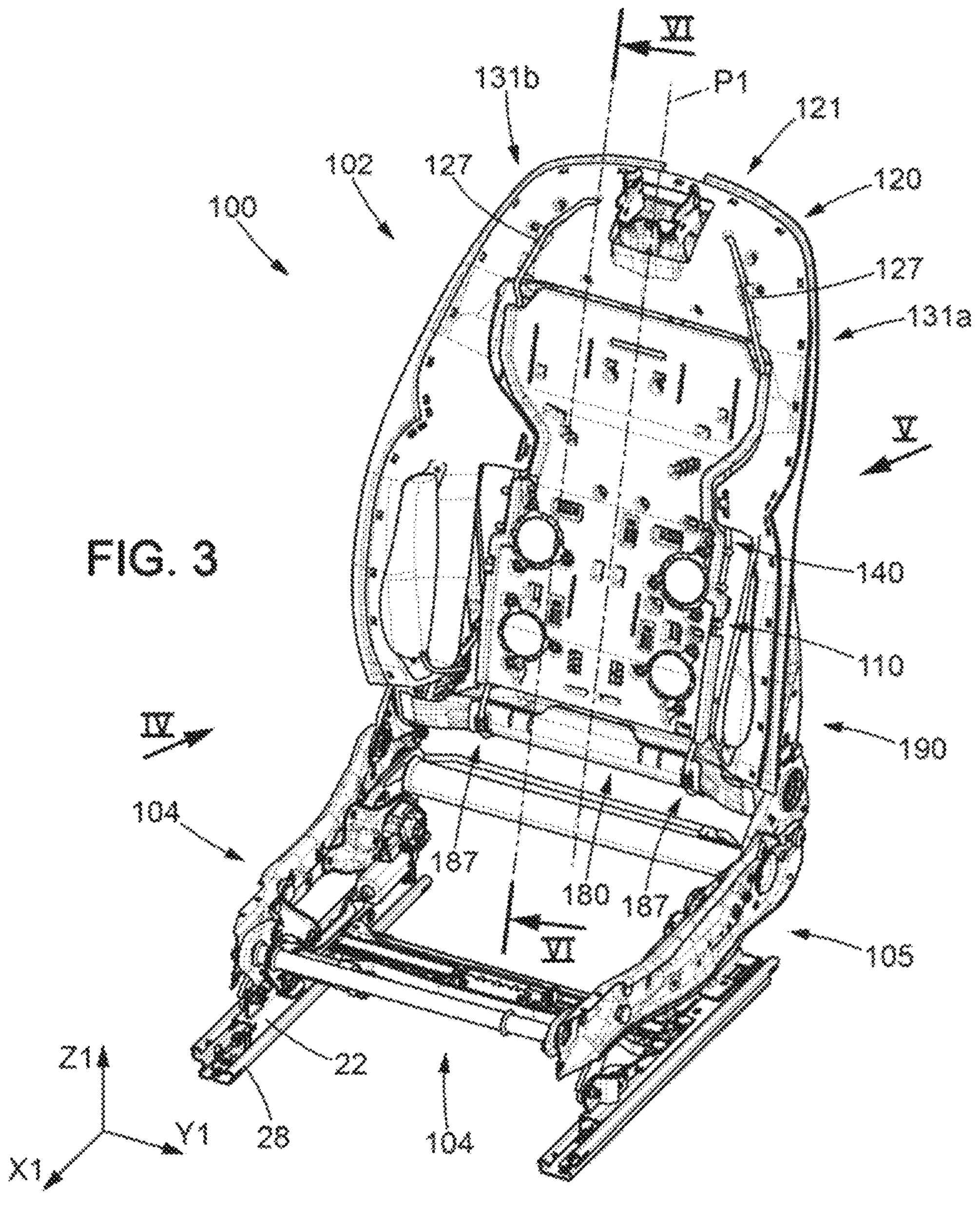
Figure 4:
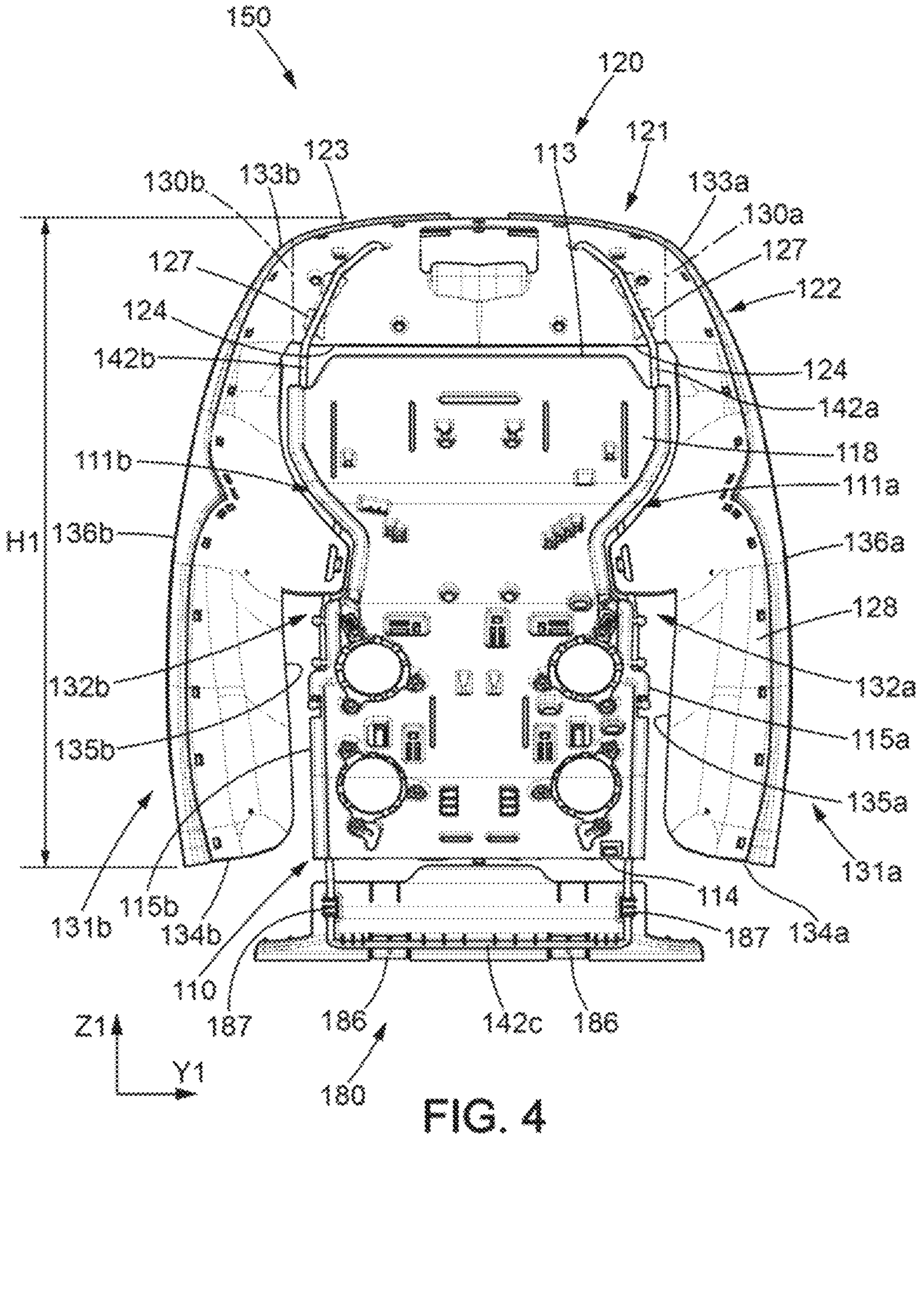
Figure 5:
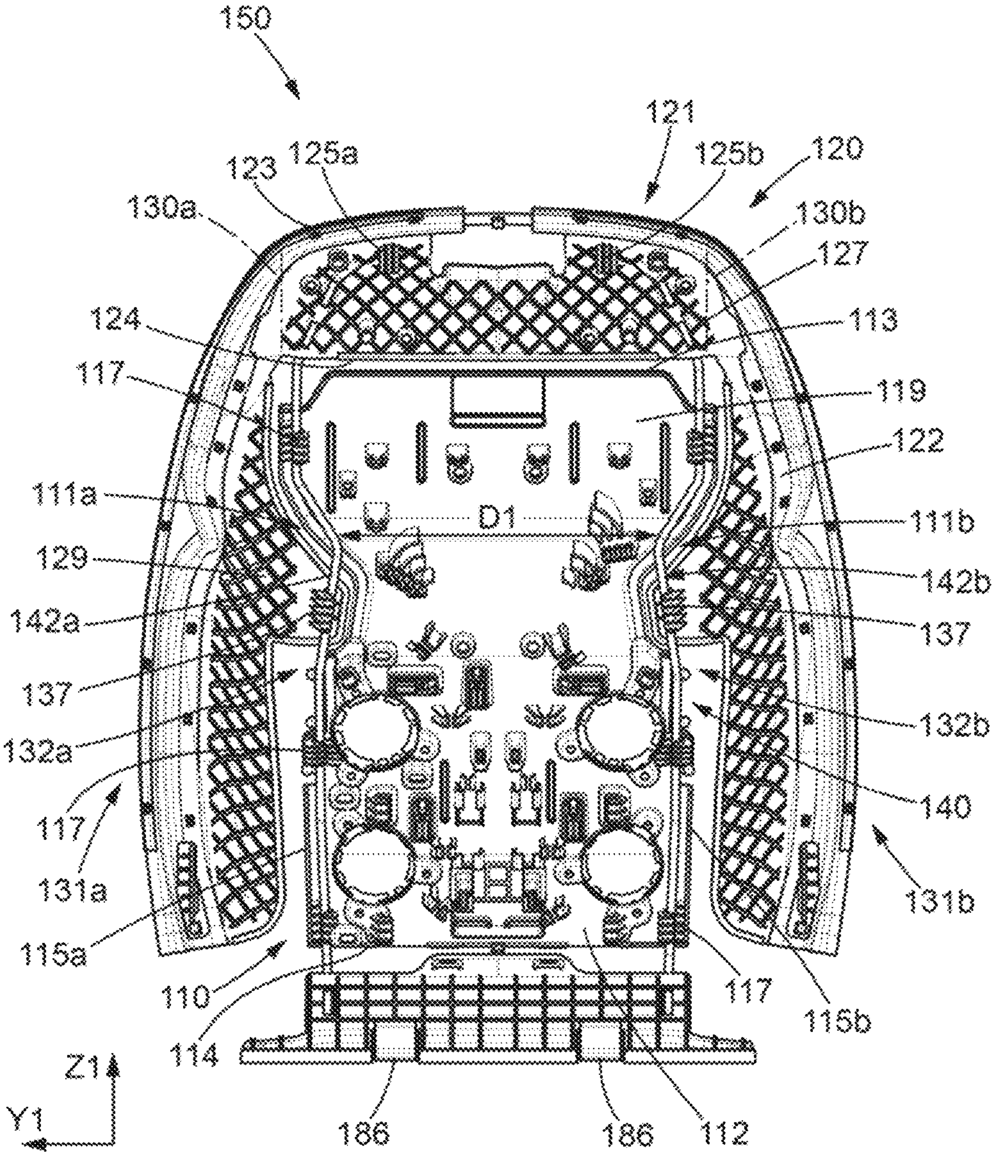
Figure 6:
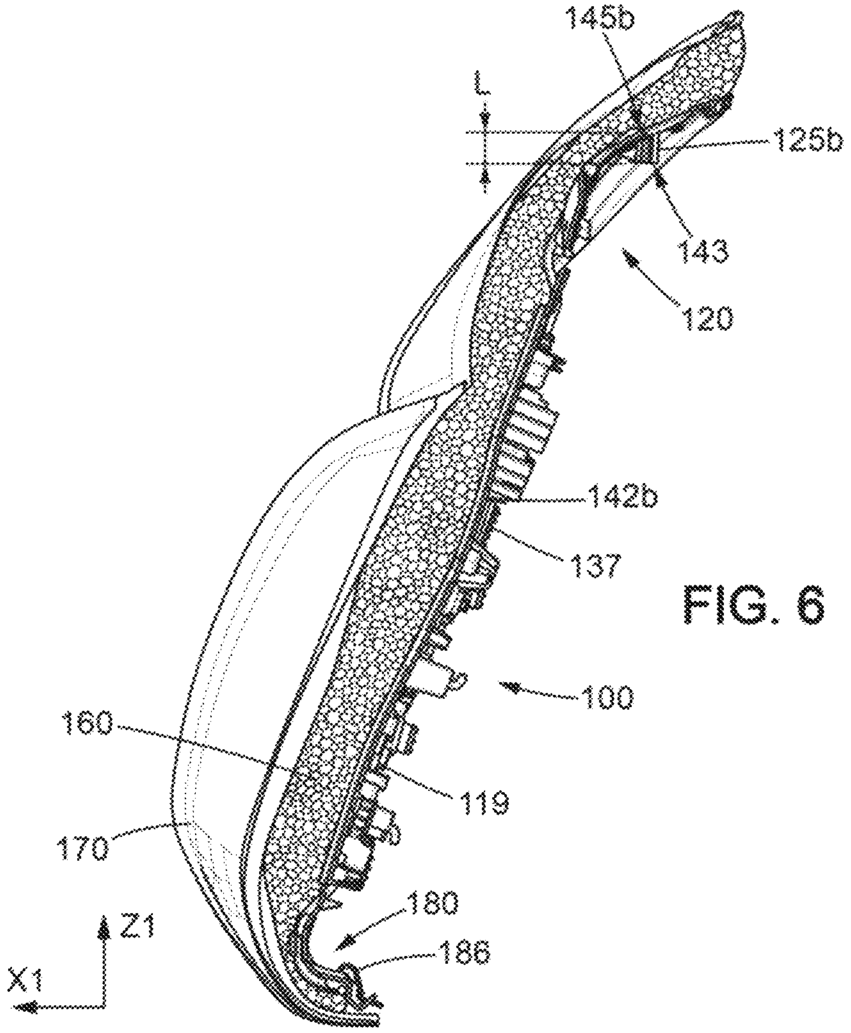
Figure 7:
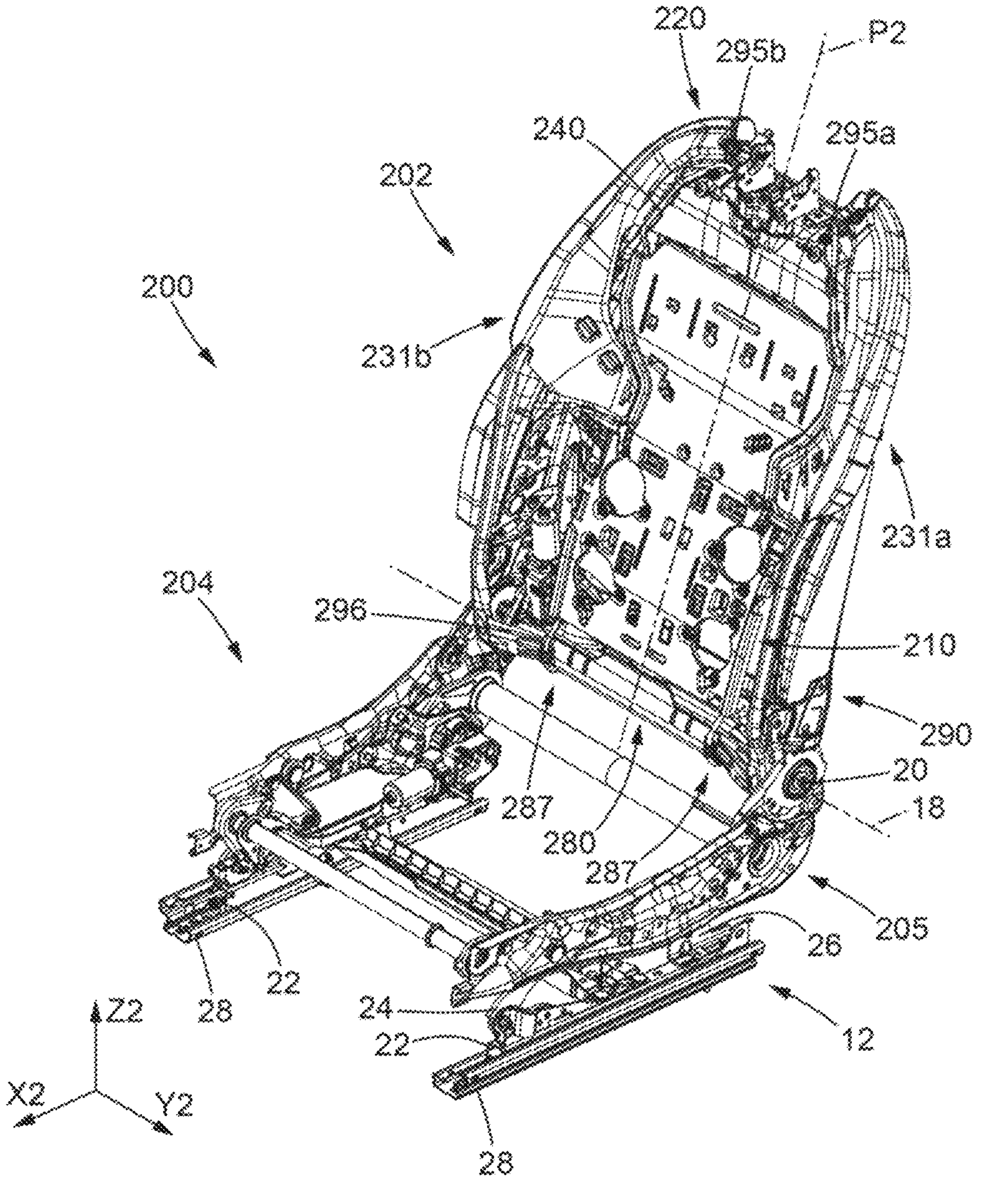
Figure 8:
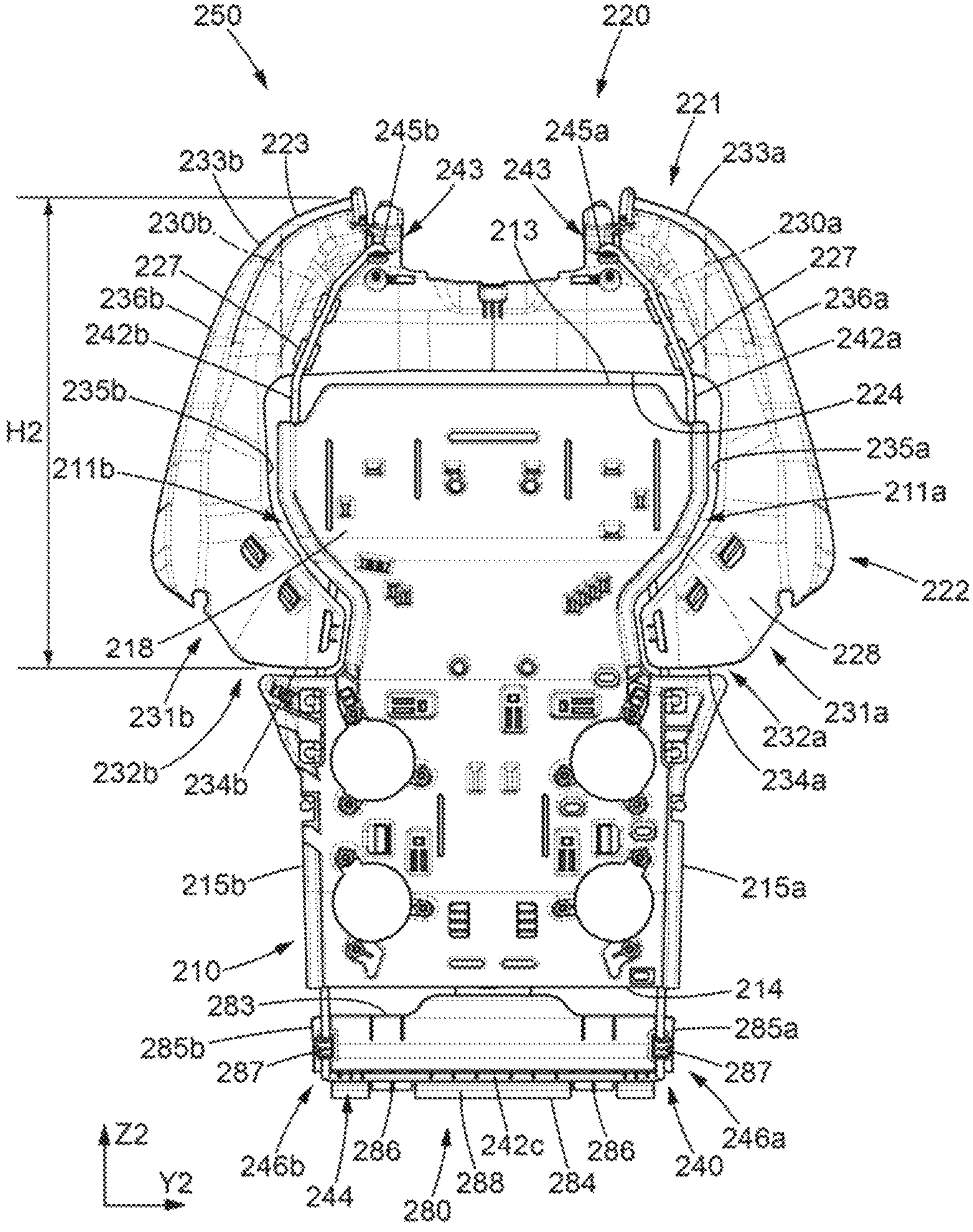
Figure 9:
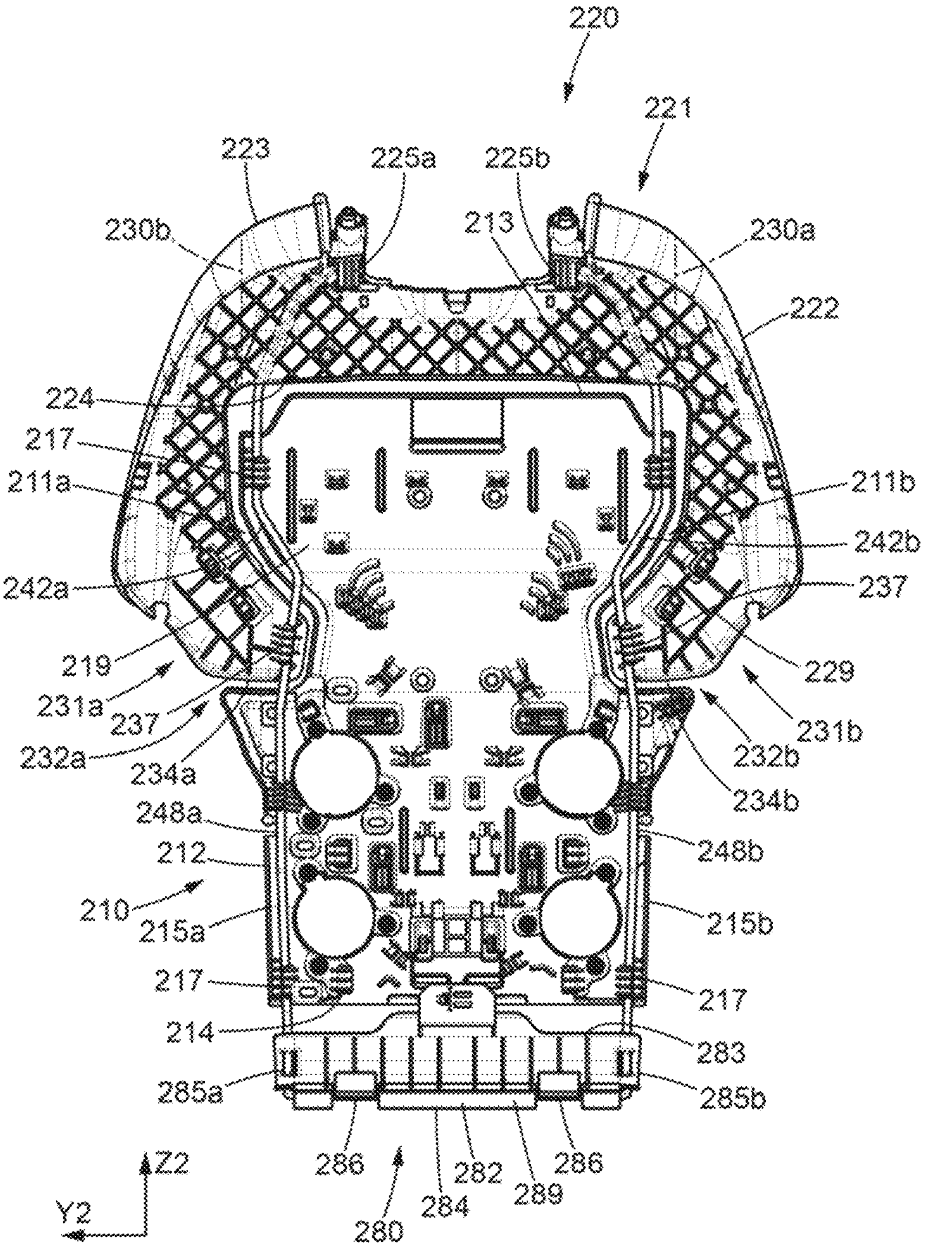

The detailed description particularly refers to the accompanying figures in which:

FIG. 1 schematically shows a side view of a first vehicle seat comprising a first backrest;

FIG. 2 shows an exploded perspective view of the first seat comprising the first backrest, the first backrest comprising a first suspension system, FIG. 3 shows in perspective the first vehicle seat, FIG. 4 shows the first suspension system in front view, along the arrow marked IV in FIG. 3, FIG. 5 shows the first suspension system in rear view, along the arrow marked V in FIG. 3, FIG. 6 shows the first backrest in cross-section along the line marked VI-VI in FIG. 3, FIG. 7 shows a second seat comprising a second backrest, in perspective according to FIG. 3, the second backrest comprising a second suspension system, FIG. 8 shows the second suspension system in front view, and FIG. 9 shows the second suspension system in rear view.

DETAILED DESCRIPTION

In the various figures, the same references designate identical or similar elements. For simplicity's sake, only the elements that are useful for understanding the described embodiment are shown in the figures and are described in detail below.

In the following description, when referring to terms qualifying absolute position, such as the terms "front", "rear", "top", "bottom", "left", "right", etc., or relative ones, such as the terms "above", "below", "upper", "lower", etc., or to qualifiers of orientation, such as "horizontal", "vertical", etc., reference is made, unless otherwise specified, to the orientation of the figures or a vehicle seat in its normal position of use.

FIG. 1 schematically shows first seat 100 mounted in a motor vehicle 1.

A first longitudinal direction X1 is understood to mean the longitudinal direction of the first seat 100. The longitudinal direction of the seat is considered to be the same as the longitudinal direction of the motor vehicle 1 wherein the seat 100 is mounted. This first longitudinal direction X1 corresponds to the normal direction in which the vehicle advances. The first longitudinal direction X1 is substantially horizontal. The first transverse direction Y1 is understood to mean the transverse direction of the first seat 100 and thus corresponds to the transverse or lateral direction of the motor vehicle. This first transverse direction Y1 corresponds to a direction perpendicular to the first longitudinal direction X1. The first transverse direction Y1 is substantially horizontal. Finally, a first elevation direction Z1 is a substantially vertical direction of the seat, perpendicular to the first longitudinal direction X1 and to the first transverse direction Y1. The first elevation direction Z1 corresponds to a vertical direction of the vehicle.

The first motor vehicle seat 100 is mounted on a slide mechanism 12. The first seat 100 comprises a first squab 104 and a first backrest 102. The first squab 104 comprises a first squab frame 105. The first backrest 102 comprises a first backrest 190. The first frame 190 is mounted on the first squab frame 105, pivotably around an axis 18, extending along the first transverse direction Y1, in the embodiment shown. To do this, a hinge mechanism 20 is arranged between the first squab frame 105 and the first frame 190.

The first squab frame 105 is mounted on movable sections 22, also called slides or male sections, via front feet 24 and rear feet 26. The slide mechanism 12 comprises the movable sections 22 and the fixed sections 28. Each movable section 22 cooperates with one of the fixed sections 28 within one of the two slides of the slide mechanism 12. Each fixed section 28 is attached to the floor 30 of a motor vehicle 1.

The first seat 100 comprises, in the embodiment shown, a manual control element 32, called a yoke, configured to control the slidable unlocking/locking of the slide mechanism 12. This manual control element 32 makes it possible in particular to release/block the systems for stopping the sliding of the movable sections 22 relative to the respective fixed sections 28. Once the stop systems have been released, the manual control element 32 can also be used to cause the movable sections 22 to slide relative to their respective fixed sections 28; in other words, the first seat 100 relative to the floor 30 in the first longitudinal direction X1. The fixed 28 and movable 22 sections are generally metallic.

Alternatively, the translation of the movable sections 22 along the first longitudinal direction X1 relative to the fixed sections 28, in other words the movement of the first seat 100 relative to the floor 30, can be controlled by an actuator.

In the embodiment shown, the first seat 102 may also comprise a headrest 34, the headrest 34 comprising a headrest frame provided with rods mounted slidably along the first elevation direction Z1 on the first frame 190 of the first backrest 102.

Below, the first backrest 102 of the first seat 100 is described in greater detail.

As shown in particular in FIGS. 2 to 6, the first backrest 102 comprises the first frame 190, a first suspension system 150, a first padding 160 and a first cover 170.

The first suspension system 150 comprises a first main support 110, a first ancillary support 120, a first secondary support 180 and a first structural core 140.

The first main support 110 is single-piece and comprises a first main plate 112 and first main resilient interlocking elements 117 (or first main clips). The first main resilient interlocking elements 117 are obtained from the same part (during the same molding operation) as the first main plate 112. The first main plate 112 has a first front main face 118 and a first rear main face 119. The first main plate 112 is substantially planar, of constant thickness, and extends substantially perpendicular in the first longitudinal direction X1. The first main plate 112 extends along the first elevation direction Z1 between a first upper main edge 113 and a first lower main edge 114. The first main plate 112 extends along the first transverse direction Y1 between a first main edge on the first side 115*a* and a first main edge on the second side 115*b*. The first upper main edge 113 and the first lower main edge 114 extend substantially along the first transverse direction Y1. The first main edge on the first side 115*a* and the first main edge on the second side 115*b* extend substantially along the first elevation direction Z1. The first main plate 112 is therefore substantially rectangular.

The first ancillary support 120 is single-piece and distinct from the first main support 110. The first ancillary support 120 comprises a first ancillary plate 122, first central resilient interlocking elements 127 (or first ancillary clips) and first lateral resilient interlocking elements 137 (or first lateral clips). The first central resilient interlocking elements 127 and the first lateral resilient interlocking elements 137 are obtained from the same part (during the same molding operation) as the first additional plate 122. The first ancillary plate 122 has a first front ancillary face 128 and a first rear ancillary face 129. The first ancillary plate 122 has a first central portion 121, a first lateral portion on the first side 131*a* and a first lateral portion on the second side 131*b*. The first central plate extends along the first elevation direction Z1 between a first upper central edge 123 and a first lower central edge 124. The first central portion 121 extends along the first transverse direction Y1 between a first boundary on the first side 130*a* and a first boundary on the second side 130*b*. The first upper central edge 123 and the first lower central edge 124 extend substantially along the first transverse direction Y1.

The first central portion 121 is adjacent to the first main plate 112. The first lower central edge 124 is opposite the first upper main edge 113. The first central portion 121 extends in the extension of the first main plate 112. The first boundary on the first side 130*a* extends in the extension of the first main edge on the first side 115*a* in the first elevation direction Z1 and the first boundary on the second side 130*b* extends in the extension of the first main edge on the second side 115*b* along the elevation direction Z1. The first central portion 121 is substantially rectangular.

The first lateral portion 131*a* extends along the first lateral direction Y1 from the first boundary on the first side 130*a* to a first outer edge on the first side 136*a* located beyond the first main edge on the first side 115*a*. The first lateral portion on the first side 131*a* extends along the first elevation direction Z1 from a first upper edge on the first side 133*a* to a first lower edge on the first side 134*a*. The first upper edge on the first side 133*a* extends along the first transverse direction Y1 in the extension of the first upper central edge 113. The first lower central edge 124 is located between the first upper central edge 123 and the first lower edge on the first side 134*a*, in other words the first lateral portion on the first side 131*a* descends lower than the first central portion 121. Furthermore, in the first elevation direction Z1, the first upper main edge 113 is located between the first lower central edge 124 and the first lower edge on the first side 134*a*, in other words the first lateral portion on the first side 131*a* has a first inner edge on the first side 135*a* extending opposite the first main edge on the first side 115*a*. Preferably, the spacing between the first inner edge on the first side 135*a* and the first main edge on the first side 115*a* is between 5 millimeters and 5 centimeters. In the embodiment illustrated, the first lower edge on the first side 134*a* is substantially at the same level along the first elevation direction Z1 as the first lower main edge 114. In other words, the first inner edge on the first side 135*a* extends opposite the first main edge 115*a* all along the first main edge on the first side 115*a*.

The first suspension system 150 has a plane of symmetry P1 extending perpendicular to the first transverse direction Y1. In particular, the first main support 110, the first ancillary support 120 and the first structural core 140 are symmetrical relative to the first plane of symmetry P1.

The first lateral portion on the second side 131*b* extends along the first lateral direction Y1 from the first boundary on the second side 130*b* to a first outer edge on the second side 136*b* located beyond the first main edge on the second side 115*b*. The first lateral portion on the second side 131*b* extends along the first elevation direction Z1 from a first upper edge on the second side 133*b* to a first lower edge on the second side 134*b*. The first upper edge on the second side 133*b* extends along the first transverse direction Y1 in the extension of the first upper central edge 113. The first lower central edge 124 is located between the first upper central edge 123 and the first lower edge on the second side 134*b*, in other words the first lateral portion on the second side 131*b* descends lower than the first central portion 121. Furthermore, in the first elevation direction Z1, the first upper main edge 113 is located between the first lower central edge 124 and the first lower edge on the second side 134*b*, in other words the first lateral portion on the second side 131*b* has a first inner edge on the second side 135*b* extending opposite the first main edge on the second side 115*b*. Preferably, the spacing between the first inner edge on the second side 135*a* and the first main edge on the second side 115*b* is between 5 millimeters and 5 centimeters. In the embodiment illustrated, the first lower edge on the second side 134*a* is substantially at the same level along the first elevation direction Z1 as the first lower main edge 114. In other words, the first inner edge on the second side 135*b* extends opposite the first main edge 115*b* all along the first main edge on the second side 115*b*.

The first ancillary support 120 extends along the first elevation direction Z1 over a first height H1 between the first upper central edge 123 and a first lower ancillary edge defined by the first lower edge on the first side 134*a* and the first lower edge on the second side 134*b*.

As shown in particular in FIGS. 4 and 5, the first main resilient interlocking elements 117 are arranged on the first main face 119 along the first main edge on the first side 115*a* and the first main edge on the second side 115*b*. The first central interlocking elements 127 are arranged on the first front ancillary face 128, in the first central portion 121, near the first boundary on the first side 130*a* and the first boundary on the second side 130*b*. The first lateral resilient interlocking elements 137 are arranged on the first rear ancillary face 129.

The first main plate 112 has a first recess on the first side 111*a*, the first edge on the first side 115*a* forming a recess along the first transverse direction Y1 and a first recess on the second side 111*b*, the first side edge 115*b* forming a recess in the first transverse direction Y1. The first lateral portion on the first side 131*a* has a first flange on the first side 132*a* protruding toward the first main plate 112 in the first transverse direction Y1 and inserted into the first recess on the first side 11*a*. The first flange on the first side 132*a* carries one of the first lateral resilient interlocking elements 137. The first lateral portion on the second side 131*b* has a first flange on the second side 132*b* protruding toward the first main plate 112 in the first transverse direction Y1 and inserted into the first recess on the second side 111*b*. The first lateral portion on the second side 131*b* carries one of the first lateral resilient interlocking elements 137.

The first main support 110, the first ancillary support 120 and the first secondary support 180 are preferably made of plastic material.

The first structural core 140 extends along the first elevation direction Z1 between a first upper structural end 143 and a first lower structural end 144. The first structural core 140 is attached to the first frame 190 at the first upper structural end 143 and the first lower structural end 144.

In the illustrated embodiment, the first structural core 140 more precisely comprises a first wire 142. The first wire 142 comprises a first wire portion on the first side 142*a*, a first wire portion on the second side 142*b* and a first lower wire portion 142*c*. The first wire portion on the first side 142*a* and the first wire portion on the second side 142*b* extend substantially along the first elevation direction Z1. The first lower wire portion 142*c* extends substantially along the first transverse direction Y1. The first lower wire portion 142*c* extends to the first lower structural end 144. The first lower wire portion 142*c* extends between the first wire portion on the first side 142*a* and the first wire portion on the second side 142*b*, so that the first wire portion on the first side 142*a*, the first lower wire portion 142*c* and the first wire portion on the second side 142*b* form three successive parts of the single first wire 142 constituting the first structural core 140.

The first wire portion on the first side 142*a* has a first upper fastening portion on the first side 145*a*. The first upper fastening portion on the first side 145*a* is curved around the first transverse direction Y1, the first upper fastening portion on the first side 145*a* thus forming a hook. As shown in particular in FIG. 5, the first central portion 121 comprises a first bore on the first side 125*a* having a length L greater than or equal to 3 centimeters and projecting relative to the first rear main face 119. At the first upper structural end 143, the first upper fastening portion on the first side 145*a* is rectilinear and received in the first bore on the first side 125*a*.

The first wire portion on the second side 142*b* has a first upper fastening portion on the second side 145*b*. The first upper fastening portion on the second side 145*b* is curved around the first transverse direction Y1, the first upper fastening portion on the second side 145*a* thus forming a hook. As shown in particular in FIG. 5, the first central portion 121 has a first bore on the second side 125*b* projecting over at least 3 centimeters relative to the first rear main face 119. At the first upper structural end 143, the first upper fastening portion on the second side 145*a* is rectilinear and received in the first bore on the second side 125*b*.

The first upper fastening portion on the first side 145*a* and the first upper fastening portion on the second side 145*b* are curved around the first transverse direction Y1 between 120 degrees and 180 degrees, preferably over about 150 degrees.

The first upper structural end 143 of the first upper fastening portion on the first side 145*a* and the first bore on the first side 125*a* closely surrounding the first upper structural end 143 of the first upper fastening portion on the first side 145*a* are received in a first fastening hole on the first side 195*a* of the first frame 190. The first upper structural end 143 of the first upper fastening portion on the second side 145*b* and the first bore on the second side 125*b* closely surrounding the first upper structural end 143 of the first upper fastening portion on the second side 145*b* are received in a first fastening hole on the second side 195*b* of the first frame 190.

The first wire portion on the first side 142*a* has a first lower fastening portion on the first side 146*a*. The first lower fastening portion on the first side 146*a* is curved around the first transverse direction Y1 at the first lower structural end 144 between 80 degrees and 100 degrees, in the same direction as the first upper fastening portion on the first side 145*a* and the first upper fastening portion on the second side 145*b*. The first wire portion on the second side 142*b* has a first lower fastening portion on the second side 146*b*. The first lower fastening portion on the second side 146*b* is curved around the first transverse direction Y1 at the first lower structural end 144 between 80 degrees and 100 degrees, in the same direction as the first upper fastening portion on the first side 146*a*.

The first wire portion on the first side 142*a* has a first holding portion on the first side 148*a* between the first upper fastening portion on the first side 145*a* and the first upper fastening portion on the first side 146*a*. The first wire portion on the second side 142*b* has a first holding portion on the second side 148*b* between the first upper fastening portion on the second side 145*b* and the first lower fastening portion on the first side 146*b*.

The first main support 110 is attached directly to the first holding portion on the first side 148*a* by the first resilient interlocking elements 117 arranged along the first main edge on the first side 115*a* and on the first holding portion on the second side 148*b* by the first resilient interlocking elements 117 arranged along the first main edge on the second side 115*b*.

The first ancillary support 120 is attached directly to the first structural core 140. More particularly, the first central portion 121 is attached directly to the first holding portion on the first side 148*a* by means of the first resilient central interlocking elements 127 arranged along the first border on the first side 130*a* and on the first holding portion on the second side 148*b* by means the first resilient central interlocking elements 127 arranged near the first border on the second side 130*b*. The first lateral portion on the first side 131*a* is attached to the first holding portion on the first side 148*a* via one of the first resilient interlocking elements 137. The first lateral portion on the second side 131*b* is attached to the first holding portion on the second side 148*b* via one of the first resilient lateral interlocking elements 137.

The first wire portion on the first side 142*a*, in particular the first holding portion on the first side 148*a*, is separated along the first transverse direction Y1 by a first distance D1, preferably between 20 centimeters and 50 centimeters, relative to the first wire portion on the second side 142*b*, in particular relative to the first holding portion on the second side 148*b*.

The first wire 142 has a cross-section preferably comprised between 10 square millimeters and 100 square millimeters. The first wire 142 is preferably made of steel, sometimes referred to as spring steel.

The first secondary support 180 comprises a first secondary plate 182 and first secondary resilient interlocking elements 187 (or first secondary clips). The first secondary resilient interlocking elements 187 are obtained from the same part (during the same molding operation) as the first secondary plate 182. The first secondary plate 182 has a first front secondary face 188 and a first rear secondary face 189.

The first secondary plate 182 is of constant thickness and curved. The first secondary plate 182 extends along the first elevation direction Z1 and the first longitudinal direction X1 between a first upper secondary edge 183 and a first rear secondary edge 184. The first secondary plate 182 extends along the first transverse direction Y1 between a first secondary edge on the first side 185*a* and a first secondary edge on the second side 185*b*. The first upper secondary edge 183 and the first rear secondary edge 184 extend substantially along the first transverse direction Y1. The first secondary edge on the first side 185*a* and the first secondary edge on the second side 185*b* extend from the first upper secondary edge 183 to the first rear secondary edge 184 along the first elevation direction Z1, then gradually toward the first longitudinal direction X1, and further away from each other along the first transverse direction Y1.

The first upper secondary edge 183 is opposite the first lower main edge 114. The first secondary plate 182 extends in the extension of the first main plate 112, the first main plate 110 being arranged between the first secondary plate 182 and the first ancillary plate 122 along the first elevation direction Z1.

The first secondary plate 182 is curved, in order to conform to the shape of the first structural core 140 near the first lower structural end 144. In particular, the first secondary plate 182 is in contact with the first lower fastening portion on the first side 146*a* and the first lower fastening portion on the second side 146*b*.

The first secondary resilient interlocking elements 187 are arranged on the first rear secondary face 189. The first secondary support 180 is attached directly to the first lower fastening portion on the first side 148*a* and to the first lower fastening portion on the second side 148*b* by the first secondary resilient interlocking elements 187. Alternatively or in addition to the illustrated first secondary resilient interlocking elements 187, the first secondary support 180 could be attached to the first lower wire portion 142*c* by similar resilient interlocking elements.

As shown in particular in FIGS. 5 and 6, the first secondary support 180 further incorporates first resilient fastening tabs 186 projecting from the first rear secondary face 189 and cooperating with the first lower crossmember 196 to releasably secure the first structural core 140 to the first frame 190.

To produce the first backrest 102, the first main support 110, the first ancillary support 120, the first structural core 140 and the first secondary support 180 are made. Then, the first suspension system 150 is made by attaching the first main support 110, the first ancillary support 120 and the first secondary support 180 onto the first structural core 140. The first suspension system 150 then forms a first module, all of the elements of which are held relative to one another. The first suspension system 150 can then be easily transported into a place where the first frame 190 is manufactured.

The first structural core 140 and more generally the first suspension system is then suspended on the first frame 190 (by inserting the first upper structural end 143 into the first fastening hole on the first side 195*a* and the first second fastening hole on the second side 195*b*). Then, the first lower structural end 144 is engaged under the first lower crossmember 196 of the first frame 190. The first resilient fastening tabs 186 deform, then resiliently return to form a stop that attaches the first lower structural end 144 to the first frame 190.

The first padding 180 is then arranged on the first front main face 118, the first front ancillary face 128 and the first front secondary face 188. The first padding 180 is then covered with the first cover 170 and the first cover 170 is held on the first framework 190 by any suitable techniques, which holds the first padding 180 between the first cover 170 and the first suspension system 150.

In one variant, the first padding could be made from a single part by applying foam onto the first suspension system or alternatively in several parts respectively foamed onto the first main support 110, the first ancillary support 120 and the first secondary support 180.

FIGS. 7 to 9 shows a second seat 200 intended to be mounted in a motor vehicle.

The second motor vehicle seat 200 is mounted on a slide mechanism 12. The second seat 200 comprises a second squab 204 and a second backrest 202. The second squab 204 comprises a second squab frame 205. The second backrest 202 comprises a second frame 290. The second frame 290 is mounted on the second squab frame 205, pivotably around an axis 18, extending, in the illustrated embodiment, along a second transverse direction Y2 perpendicular to the second longitudinal direction X2 and to the second elevation direction Z2. To do this, a hinge mechanism 20 is arranged between the second squab frame 205 and the second frame 290.

The second squab frame 205 is mounted on movable sections 22, also called slides or male sections, via front feet 24 and rear feet 26. The slide mechanism 12 comprises the movable sections 22 and the fixed sections 28. Each movable section 22 cooperates with one of the fixed sections 28 within one of the two slides of the slide mechanism 12. Each fixed section 28 is intended to be attached to a floor of the motor vehicle.

The second seat 200 comprises, in the embodiment shown, a manual control element (not shown), called a yoke, configured to control the slidable unlocking/locking of the slide mechanism 12. This manual control element makes it possible in particular to release/block the systems for stopping the sliding of the movable sections 22 relative to the respective fixed sections 28. Once the stop systems have been released, the manual control element can also be used to cause the movable sections 22 to slide relative to their respective fixed sections 28; in other words, the second seat 200 relative to the floor in the second longitudinal direction X2. The fixed 28 and movable 22 sections are generally metallic.

Alternatively, the translation of the movable sections 22 along the second longitudinal direction X2 relative to the fixed sections 28, in other words the movement of the second seat 200 relative to the floor 30, can be controlled by an actuator.

In the embodiment shown, the second seat 202 may also comprise a headrest, the headrest comprising a headrest frame provided with rods slidably mounted on the second frame 290, along a second elevation direction Z2 perpendicular to the second longitudinal direction X2.

Below, the second backrest 202 of the second seat 200 is described in greater detail.

As shown in particular in FIGS. 7 to 9, the second backrest 202 comprises the second frame 290, a second suspension system 250, a second padding and a second cover (not shown).

The second suspension system 250 comprises a second main support 210, a second ancillary support 220, a second secondary support 280 and a second structural core 240.

The second main support 210 is single-piece and comprises a second main plate 212 and second main resilient interlocking elements 217 (or second main clips). The second main resilient interlocking elements 217 are obtained from the same part (during the same molding operation) as the second main plate 222. The second main plate 212 has a second front main face 218 and a second rear main face 219. The second main plate 212 is substantially planar, of constant thickness, and extends substantially perpendicular in the second longitudinal direction X2. The second main plate 212 extends along the second elevation direction Z2 between a second upper main edge 213 and a second lower main edge 214. The second main plate 212 extends along the second transverse direction Y2 between a second main edge on the first side 215*a* and a second main edge on the second side 215*b*. The second upper main edge 213 and the second lower main edge 214 extend substantially along the second transverse direction Y2. The second main edge on the first side 215*a* and the second main edge on the second side 215*b* extend substantially along the second elevation direction Z2. The second main plate 212 is therefore substantially rectangular.

The second ancillary support 220 is single-piece and distinct from the second main support 210. The second ancillary support 220 comprises a second ancillary plate 222, second central resilient interlocking elements 227 (or second ancillary clips) and second lateral resilient interlocking elements 237 (or second lateral clips). The second central resilient interlocking elements 227 and the second lateral resilient interlocking elements 137 are obtained from the same part (during the same molding operation) as the second additional plate 222. The second ancillary plate 222 has a second front ancillary face 228 and a second rear ancillary face 229. The second ancillary plate 222 has a second central portion 221, a second lateral portion on the first side 231*a* and a second lateral portion on the second side 231*b*. The second central plate extends along the second elevation direction Z2 between a second upper central edge 223 and a second lower central edge 224. The second central portion 221 extends along the second transverse direction Y2 between a second boundary on the first side 230*a* and a second boundary on the second side 230*b*. The second upper central edge 223 and the second lower central edge 224 extend substantially along the second transverse direction Y2.

The second central portion 221 is adjacent to the second main plate 212. The second lower central edge 224 is opposite the second upper main edge 213. The second central portion 221 extends in the extension of the second main plate 212. The second boundary on the first side 230*a* extends in the extension of the second main edge on the first side 215*a* in the second elevation direction Z2 and the second boundary on the second side 230*b* extends in the extension of the second main edge on the second side 215*b* along the elevation direction Z2. The second central portion 221 is substantially rectangular.

The second lateral portion 231*a* extends along the second lateral direction Y2 from the second boundary on the first side 230*a* to a second outer edge on the first side 236*a* located beyond the second main edge on the first side 215*a*. The second lateral portion on the first side 231*a* extends along the second elevation direction Z2 from a second upper edge on the first side 233*a* to a second lower edge on the first side 234*a*. The second upper edge on the first side 233*a* extends along the second transverse direction Y2 in the extension of the second upper central edge 213. The second lower central edge 224 is located between the second upper central edge 223 and the second lower edge on the first side 234*a*, in other words the second lateral portion on the first side 231*a* descends lower than the second central portion 221. Furthermore, in the second elevation direction Z2, the second upper main edge 213 is located between the second lower central edge 224 and the second lower edge on the first side 234*a*, in other words the second lateral portion on the first side 231*a* has a second inner edge on the first side 235*a* extending opposite the second main edge on the first side 215*a*. Preferably, the spacing between the second inner edge on the first side 235*a* and the second main edge on the first side 215*a* is between 5 millimeters and 5 centimeters. In the embodiment illustrated, the second lower edge on the first side 234*a* is substantially at the same level along the second elevation direction Z2 as the second lower main edge 214. In other words, the second inner edge on the first side 235*a* extends opposite the second main edge 215*a* all along the second main edge on the first side 215*a*.

The second suspension system 250 has a plane of symmetry P2 extending perpendicular to the second transverse direction Y2. In particular, the second main support 210, the second ancillary support and the second structural core 240 are symmetrical relative to the second plane of symmetry P2.

The second lateral portion on the second side 231*b* extends along the second lateral direction Y2 from the second boundary on the second side 230*b* to a second outer edge on the second side 236*b* located beyond the second main edge on the second side 215*b*. The second lateral portion on the second side 231*b* extends along the second elevation direction Z2 from a second upper edge on the second side 233*b* to a second lower edge on the second side 234*b*. The second upper edge on the second side 233*b* extends along the second transverse direction Y2 in the extension of the second upper central edge 213. The second lower central edge 224 is located between the second upper central edge 223 and the second lower edge on the second side 234*b*, in other words the second lateral portion on the second side 231*b* descends lower than the second central portion 221. Furthermore, in the second elevation direction Z2, the second upper main edge 213 is located between the second lower central edge 224 and the second lower edge on the second side 234*b*, in other words the second lateral portion on the second side 231*b* has a second inner edge on the second side 235*b* extending opposite the second main edge on the second side 215*b*. Preferably, the spacing between the second inner edge on the second side 235*b* and the second main edge on the second side 215*b* is between 5 millimeters and 5 centimeters. In the embodiment illustrated, the second lower edge on the second side 234*a* is substantially at the same level along the second elevation direction Z2 as the second lower main edge 214. In other words, the second inner edge on the second side 235*b* extends opposite the second main edge 215*b* all along the second main edge on the second side 215*b*.

The second ancillary support 220 extends along the second elevation direction Z2 over a second height H2 between the second upper central edge 223 and a second lower ancillary edge defined by the second lower edge on the first side 234*a* and the second lower edge on the second side 234*b*.

As shown in particular in FIGS. 8 and 9, the second main resilient interlocking elements 217 are arranged on the second main face 219 along the second main edge on the first side 215*a* and the second main edge on the second side 215*b*. The second central interlocking elements 227 are arranged on the second front ancillary face 228, in the second central portion 221, near the second boundary on the first side 230*a* and the second boundary on the second side 230*b*. The second lateral resilient interlocking elements 237 are arranged on the second rear ancillary face 229.

The second main plate 212 has a second recess on the first side 211*a*, the second edge on the first side 215*a* forming a recess along the first transverse direction Y2 and a first recess on the second side 211*b*, the second side edge 215*b* forming a recess in the second transverse direction Y2. The second lateral portion on the first side 231*a* has a second flange on the first side 232*a* protruding toward the second main plate 212 in the second transverse direction Y2 and inserted into the second recess on the first side 211*a*. The second flange on the first side 232*a* carries one of the second lateral resilient interlocking elements 237. The second lateral portion on the second side 231*b* has a second flange on the second side 232*b* protruding toward the second main plate 212 in the second transverse direction Y2 and inserted into the second recess on the second side 211*b*. The second lateral portion on the second side 231*b* carries one of the second lateral resilient interlocking elements 237.

The second main support 210, the second ancillary support 220 and the second secondary support 280 are preferably made of plastic material.

The second structural core 240 extends along the second elevation direction Z2 between a second upper structural end 243 and a second lower structural end 244. The second structural core 240 is attached to the second frame 290 at the second upper structural end 243 and the second lower structural end 244.

In the illustrated embodiment, the second structural core 240 more precisely comprises a second wire 242. The second wire 242 comprises a second wire portion on the first side 242*a*, a second wire portion on the second side 242*b* and a second lower wire portion 242*c*. The second wire portion on the first side 242*a* and the second wire portion on the second side 242*b* extend substantially along the second elevation direction Z2. The second lower wire portion 242*c* extends substantially along the second transverse direction Y2. The second lower wire portion 242*c* extends to the second lower structural end 244. The second lower wire portion 242*c* extends between the second wire portion on the first side 242*a* and the second wire portion on the second side 242*b*, so that the second wire portion on the first side 242*a*, the second lower wire portion 242*c* and the second wire portion on the second side 242*b* form three successive parts of the single second wire 242 constituting the second structural core 240.

The second wire portion on the first side 242*a* has a second upper fastening portion on the first side 245*a*. The second upper fastening portion on the first side 245*a* is curved around the second transverse direction Y2, the second upper fastening portion on the first side 245*a* thus forming a hook. As shown in particular in FIG. 9, the second central portion 221 has a second bore on the second side 225*a* projecting over at least 3 centimeters relative to the second rear main face 219. At the second upper structural end 243, the second upper fastening portion on the first side 245*a* is rectilinear and received in the second bore on the first side 225*a*.

The second wire portion on the second side 242*b* has a second upper fastening portion on the second side 245*b*. The second upper fastening portion on the second side 245*b* is curved around the second transverse direction Y2, the second upper fastening portion on the second side 245*a* thus forming a hook. As shown in particular in FIG. 9, the second central portion 221 has a second bore on the second side 225*b* projecting over at least 3 centimeters relative to the second rear main face 219. At the second upper structural end 243, the second upper fastening portion on the second side 245*a* is rectilinear and received in the second bore on the second side 225*b*.

The second upper fastening portion on the first side 245*a* and the second upper fastening portion on the second side 245*b* are curved around the second transverse direction Y2 between 120 degrees and 180 degrees, preferably over about 150 degrees.

The second upper structural end 243 of the second upper fastening portion on the first side 245*a* and the second bore on the first side 225*a* closely surrounding the second upper structural end 243 of the second upper fastening portion on the first side 245*a* are received in a second fastening hole on the first side 295*a* of the second frame 290. The second upper structural end 243 of the second upper fastening portion on the second side 245*b* and the second bore on the second side 225*b* closely surrounding the second upper structural end 243 of the second upper fastening portion on the second side 245*b* are received in a second fastening hole on the second side 295*b* of the second frame 290.

The second wire portion on the first side 242*a* has a second lower fastening portion on the first side 246*a*. The second lower fastening portion on the first side 246*a* is curved around the second transverse direction Y2 at the second lower structural end 244 between 80 degrees and 100 degrees, in the same direction as the second upper fastening portion on the first side 245*a* and the second upper fastening portion on the second side 245*b*. The second wire portion on the second side 242*b* has a second lower fastening portion on the second side 246*b*. The second lower fastening portion on the second side 246*b* is curved around the second transverse direction Y2 at the second lower structural end 244 between 80 degrees and 100 degrees, in the same direction as the second upper fastening portion on the first side 246*a*.

The second wire portion on the first side 242*a* has a second holding portion on the first side 248*a* between the second upper fastening portion on the first side 245*a* and the second upper fastening portion on the first side 246*a*. The second wire portion on the second side 242*b* has a second holding portion on the second side 248*b* between the second upper fastening portion on the second side 245*b* and the second lower fastening portion on the second side 246*b*.

The second main support 210 is attached directly to the second holding portion on the first side 248*a* by the second resilient interlocking elements 217 arranged along the second main edge on the first side 215*a* and on the second holding portion on the second side 248*b* by the second resilient interlocking elements 217 arranged along the second main edge on the second side 215*b*.

The second ancillary support 220 is attached directly to the second structural core 240. More particularly, the second central portion 221 is attached directly to the second holding portion on the first side 248*a* by means of the second resilient central interlocking elements 227 arranged along the second border on the first side 230*a* and on the second holding portion on the second side 248*b* by means the second resilient central interlocking elements 227 arranged near the second border on the second side 230*b*. The second lateral portion on the first side 231*a* is attached to the second holding portion on the first side 248*a* via one of the second resilient interlocking elements 237. The second lateral portion on the second side 231*b* is attached to the second holding portion on the second side 248*b* via one of the second resilient lateral interlocking elements 237.

The second wire portion on the first side 242*a*, in particular the second holding portion on the first side 248*a*, is separated along the second transverse direction Y2 by a second distance D2, preferably between 20 centimeters and 50 centimeters, relative to the second wire portion on the second side 242*b*, in particular relative to the second holding portion on the second side 248*b*.

The second wire 242 has a cross-section preferably comprised between 10 square millimeters and 100 square millimeters. The second wire 242 is preferably made of steel, sometimes referred to as spring steel.

The second secondary support 280 comprises a second secondary plate 282 and second secondary resilient interlocking elements 287 (or second secondary clips). The second secondary resilient interlocking elements 287 are obtained from the same part (during the same molding operation) as the second secondary plate 282. The second secondary plate 282 has a second front secondary face 288 and a second rear secondary face 289.

The second secondary plate 282 is of constant thickness and curved. The second secondary plate 282 extends along the second elevation direction Z2 and the second longitudinal direction X2 between a second upper secondary edge 283 and a second rear secondary edge 284. The second secondary plate 282 extends along the second transverse direction Y2 between a second secondary edge on the first side 285*a* and a second secondary edge on the second side 285*b*. The second upper secondary edge 283 and the second rear secondary edge 284 extend substantially along the second transverse direction Y2. The second secondary edge on the first side 285*a* and the second secondary edge on the second side 285*b* extend from the second upper secondary edge 83 to the second rear secondary edge 284 in the second elevation direction Z2, then gradually toward the second longitudinal direction X2.

The second upper secondary edge 283 is opposite the second lower main edge 214. The second secondary plate 282 extends in the extension of the second main plate 212, the second main plate 210 being arranged between the second secondary plate 282 and the second ancillary plate 222 along the second elevation direction Z2.

The second secondary plate 282 is curved, in order to conform to the shape of the second structural core 240 near the second lower structural end 244. In particular, the second secondary plate 282 is in contact with the second lower fastening portion on the first side 246*a* and the second lower fastening portion on the second side 246*b*.

The second secondary resilient interlocking elements 287 are arranged on the second rear secondary face 289. The second secondary support 280 is attached directly to the second lower fastening portion on the first side 248*a* and to the second lower fastening portion on the second side 248*b* by the second secondary resilient interlocking elements 287. Alternatively or in addition to the illustrated second secondary resilient interlocking elements 287, the second secondary support 280 could be attached to the second lower wire portion 242*c* by similar resilient interlocking elements.

As shown in particular in FIG. 9, the second secondary support 280 further incorporates second resilient fastening tabs 286 projecting from the second rear secondary face 289 and cooperating with the second lower crossmember 296 to releasably secure the second structural core 240 to the second frame 290.

To produce the second backrest 202, the second main support 210, the second ancillary support 220, the second structural core 240 and the second secondary support 280 are made. Then, the second suspension system 250 is made by attaching the second main support 210, the second ancillary support 220 and the second secondary support 280 onto the second structural core 240. The second suspension system 250 then forms a second module, all of the elements of which are held relative to one another. The second suspension system 250 can then be easily transported into a place where the second frame 290 is manufactured.

The second structural core 240 and more generally the second suspension system is then suspended on the second frame 290 (by inserting the second upper structural end 243 into the second fastening hole on the second side 295*a* and the second fastening hole on the second side 295*b*). Then, the second lower structural end 244 is engaged under the second lower crossmember 296 of the second frame 290. The second resilient fastening tabs 286 deform, then resiliently return to form a stop that attaches the second lower structural end 244 to the second frame 290.

The second padding is then arranged on the second front main face 218, the second front ancillary face 228 and the second front secondary face 288. The second padding is then covered with the second cover and the second cover is held on the second frame 290 by any suitable techniques, which holds the second padding 260 between the second cover 270 and the second suspension system 250.

In one variant, the second padding could be made from a single part by applying foam onto the second suspension system or alternatively in several parts respectively foamed onto the second main support 210, the second ancillary support 220 and the second secondary support 280.

The second main support 210 is geometrically identical to the second main support 110. In other words, the first main support 110 and the second main support 210 are preferably made in the same mold. Furthermore, the second main support 210 is preferably made of the same material as the first main support 110, the first main support 110 and the second main support 210 being technically indistinguishable. A marking concerning the date of manufacture or other non-technical difference may however optionally differentiate these parts.

The second structural core 240 is geometrically and/or technically identical to the first structural core 140. Advantageously, the first structural core 140 and the second structural core 240 are undifferentiated.

Although the figures may show a few minor differences in shape between the second secondary support 280 and the first secondary support 180, preferably the second secondary support is geometrically and/or technically identical to the first secondary support 180. Advantageously, the first secondary support 180 and the second secondary support 280 are undifferentiated.

The second frame 290 is geometrically and/or technically identical to the first frame 190. Advantageously, the first frame 190 and the second frame 290 are undifferentiated.

The second lower edge on the first side 234*a* is part of the second flange on the first side 231*a* and is located in the recess on the first side 211*a*. The second lower edge on the second side 234*b* is part of the second flange on the second side 231*a* and is located in the recess on the second side 212*a*. The first lower edge on the first side 134*a* and the first lower edge on the second side 134*b* are located substantially at the same level as the first lower main edge 114 along the first elevation direction Z1. Therefore, the second height H2 is less than the first height H1 between 20 centimeters and 30 centimeters.

Alternatively, a seat could be provided that differs from the second seat in that the second lower edge on the first side 234*a* and the second lower edge on the second side 234*b* would be approximately at the same level as the second lower central edge 224.

According to another variant, a seat could be provided that differs from the second seat in that the second ancillary plate 222 would have no second lateral portion on the first side 231*a* or second lateral portion on the second side 232*a*, so that the second ancillary plate 222 would be restricted to the second central portion 221.

If desired, other supports can be provided, for example attached directly to the second frame 290 and contributing to supporting the second padding 260 with the second main support 210 and the second ancillary support 220 or directly equipped with a dedicated padding.

Of course, the disclosure is in no way limited to the embodiments described by way of non-limiting illustration. Thus, if necessary, other comfort functions can be associated with the first main support 110 and the second main support 210, since they have the shapes making it possible to receive elements fulfilling these functions. In particular, one or more loudspeakers and/or one or more vibrating devices ("exciters") and/or one or more resistive wires for heating the occupant's back can be attached to the first main support 110 and the second main support 210. Preferably, the loudspeaker(s) and/or the vibrating device(s) and/or the resistive wire (s) are arranged between on the one hand the first main support 110 or the second main support 210 and the first padding 160 or the second padding.

In the automotive field, a comparative vehicle backrest may comprise a backrest frame, at least one central lining module and two lateral lining modules each arranged on a respective side of the central lining module, each of the at least three lining modules being attachable to the backrest frame independently of the other two lining modules. Thus, the upholstery of such a comparative backrest can be easily and quickly mounted on the backrest frame. Furthermore, a module can easily be replaced.

However, with such a comparative backrest, it is difficult to connect the lining modules to one another in the absence of a backrest without complicating the replacement of a module and/or the assembly of the seat. However, since the comparative backrest frame is generally metallic and the lining modules are generally made of plastic or textile, the backrest frame and the lining modules are made using separate manufacturing techniques. Therefore, the comparative backrest frame and the lining modules are generally made at remote sites. It may therefore be necessary to transport numerous different elements to produce a seat.

To remedy the aforementioned problems, it is proposed according to the present description an assembly for a first backrest and a second backrest of a vehicle seat, the assembly comprising a first suspension system intended to be attached to a first frame (of a backrest) and a second suspension system intended to be attached to a second frame (of a backrest), wherein:

the first suspension system comprises:

- a first main support, the first main support has a first main plate, the first main plate extends in a first elevation direction between a first upper main edge and a first lower main edge, the first main plate extends along a first transverse direction between a first main edge on the first side and a first main edge on the second side, the first transverse direction is perpendicular to the first elevation direction,
- a first ancillary support, the first ancillary support has a first ancillary plate, the first ancillary plate has a first central portion extending in the extension of the first main plate along the first elevation direction, the first central portion extends along the first elevation direction between a first upper central edge and a first lower central edge, the first lower central edge extends opposite the first upper main edge, and
- a first structural core extending along the first elevation direction, the first main support is attached to the first structural core and the first ancillary support is attached to the first structural core, the second suspension system comprises:

- a second main support, the second main support has a second main plate, the second main plate extends in a second elevation direction between a second upper main edge and a second lower main edge, the second main plate extends along a second transverse direction between a second main edge on the first side and a second main edge on the second side, the second transverse direction is perpendicular to the second elevation direction,
- a second ancillary support, the second ancillary support has a second ancillary plate, the second ancillary plate has a second central portion extending in the extension of the second main plate along the second elevation direction, the second central portion extends along the second elevation direction between a second upper central edge and a second lower central edge, the second lower central edge extends opposite the second upper main edge, and a second structural core extending along the second elevation direction, the second main support is attached to the second structural core and the second ancillary support is attached to the second structural core, wherein assembly:

the second main support is geometrically identical to the first main support, and the second ancillary support geometrically differs from the first ancillary support.

Thus, the structural core performs a suspension function. Multiple different seat models can be produced, the main support of these seat models having been made in the same mold or at least in molds having molding cavities of identical dimensions to within manufacturing tolerances. Therefore, savings can be made in the development and the production of the mold, the manufacturing of the main supports, and the management of the elements constituting the backrest.

Considering manufacturing tolerances, a second main support will be considered geometrically identical to the first main support if each of its dimensions differs from those of the first support by less than 1%.

It is specified that, in accordance with the usual definition, the term "plate" means a flat, thin and rigid piece. Therefore, in particular inflatable elements are not considered to form a plate. However, the first backrest and/or the second backrest may comprise one or more inflatable element(s).

According to a complementary feature in accordance with the present description, the second main support is preferably technically identical to the first main support.

Thus, not only is the second main support geometrically identical to the first main support, but also the first main support and the second main support are made of the same material. The second main support may not be totally identical to the first main support; aesthetic differences may exist, for example a color difference due to different dyes or the affixing of a manufacturing date or the like.

Given manufacturing tolerances, a second main support geometrically identical to the first main support will be considered technically identical to the first main support if the contents of the elements constituting the material of the second main support differ by less than 1% by weight of the elements constituting the material of the first main support.

According to another feature according to the present description, preferably the first ancillary plate further has a first lateral portion on the first side, the first lateral portion on the first side extends in the first transverse direction from the first central portion to a first outer lateral edge on the first side, located beyond the first main edge on the first side (preferably at least 5 centimeters).

Thus, the first ancillary support makes it possible to adapt to the differences between the first backrest and the second backrest not only in a central part, but also in a lateral part.

According to a complementary feature in accordance with the present description, preferably the first lateral portion on the first side extends in the first elevation direction to a first bottom edge on the first side, the first bottom central edge being located between the first upper central edge and the first bottom edge on the first side along the first elevation direction, and the first lateral portion on the first side has an inner edge on the first side extending opposite the first main edge on the first side.

It is thus possible to produce a wide variety of different backrests having geometrically identical main supports.

According to a further complementary feature in accordance with the present description, preferably the first ancillary support extends along the first elevation direction over a first height between the first upper central edge and (a first lower ancillary edge to which the first lower edge on the first side belongs), the second ancillary support extends along the second elevation direction over a second height from the second upper central edge, and the first height is (strictly) greater than the second height.

Being able to vary the height of the ancillary support makes it possible to adapt effectively to the specific features of each backrest.

According to an even complementary feature in accordance with the present description, the first height is preferably greater than the second height by at least 5 centimeters, preferably by at least 10 centimeters.

In various embodiments of the assembly according to the disclosure, one and/or more of the following arrangements may also be used:

the first suspension system has a plane of symmetry extending perpendicular to the first transverse direction;

the second structural core is geometrically identical to the first structural core;

the second structural core is technically identical to the first structural core;

the first structural core comprises a first wire and the second structural core comprises a second wire;

the first wire has a first section comprised between 10 square millimeters and 100 square millimeters and the second wire having a second section comprised between 10 square millimeters and 100 square millimeters;

the first wire is made of steel and the second wire is made of steel;

the first structural core comprises a first wire portion on the first side and a first wire portion on the second side, the first wire portion on the second side and the first wire portion on the first side are separated from each other along the first transverse direction by a first distance of at least 20 centimeters, the first main support is attached to the first wire portion on the first side and the first wire portion on the second side, the second structural core comprises a second wire portion on the first side and a second wire portion on the second side, the second wire portion on the second side and the second wire portion on the first side are distant from each other along the second transverse direction by a second distance of at least 20 centimeters, and the second main support is attached to the second side wire portion on the first side and the second wire portion on the second side;

the assembly comprises a first backrest and a second backrest, the first backrest comprises the first frame and the first suspension system, the second backrest comprises the second frame and the second suspension system, the first structural core extends along the first elevation direction between a first upper structural end and a first lower structural end, the first structural core is attached to the first frame at the first upper structural end and the first lower structural end, and the second structural core extends along the second elevation direction between a second upper structural end and a second lower structural end, the second structural core is attached to the second frame at the second upper structural end and at the second lower structural end;

the second frame is geometrically identical to the first frame;

the first main support, the first ancillary support, the second main support, the second ancillary support are made of plastic material;

the assembly further comprises a first padding, a second padding, a first cover and a second cover, the first padding is arranged between the first main support and the first cover, and the second padding is arranged between the second main support and the second cover.

The invention claimed is:

1. An assembly for a first backrest and a second backrest of a vehicle seat, the assembly comprising a first suspension system for attachment to a first frame and a second suspension system for attachment to a second frame, wherein:

the first suspension system comprises:

a first main support, the first main support has a first main plate, the first main plate extends in a first elevation direction between a first upper main edge and a first lower main edge, the first main plate extends along a first transverse direction between a first main edge on the first side and a first main edge on the second side, the first transverse direction is perpendicular to the first elevation direction, a first ancillary support, the first ancillary support has a first ancillary plate, the first ancillary plate has a first central portion extending in the extension of the first main plate along the first elevation direction, the first central portion extends along the first elevation direction between a first upper central edge and a first lower central edge, the first lower central edge extends opposite the first upper main edge, and a first structural core extending along the first elevation direction, the first main support is attached to the first structural core and the first ancillary support is attached to the first structural core, the second suspension system comprises:

a second main support, the second main support has a second main plate, the second main plate extends in a second elevation direction between a second upper main edge and a second lower main edge, the second main plate extends along a second transverse direction between a second main edge on the first side and a second main edge on the second side, the second transverse direction is perpendicular to the second elevation direction, a second ancillary support, the second ancillary support has a second ancillary plate, the second ancillary plate has a second central portion extending in the extension of the second main plate along the second elevation direction, the second central portion extends along the second elevation direction between a second upper central edge and a second lower central edge, the second lower central edge extends opposite the second upper main edge, and a second structural core extending along the second elevation direction, the second main support is attached to the second structural core and the second ancillary support is attached to the second structural core, wherein:

the second main support is geometrically identical to the first main support, and the second ancillary support geometrically differs from the first ancillary support, the first ancillary plate further has a first lateral portion on the first side, the first lateral portion on the first side extends along a first lateral direction from the first central portion to a first outer edge on the first side located beyond the first main edge on the first side, the first lateral portion on the first side extends along the first elevation direction to a first side lower edge on the first side, the first lower central edge being located between the first upper central edge and the first lower edge on the first side along the first elevation direction, and the first lateral portion on the first side has a first inner edge on the first side extending opposite the first main edge on the first side.

2. The assembly of claim 1, wherein the second main support is technically identical to the first main support.

3. The assembly of claim 1, wherein:

the first ancillary support extends along the first elevation direction over a first height between the first upper central edge and the first lower edge on the first side, the second ancillary support extends along the second elevation direction over a second height from the second upper central edge, and the first height is greater than the second height.

4. The assembly of claim 3, wherein the first height is greater than the second height by at least 5 centimeters, preferably by at least 10 centimeters.

5. The assembly of claim 1, wherein the first suspension system has a first plane of symmetry extending perpendicularly to the first transverse direction.

6. The assembly of claim 1, wherein the second structural core is geometrically identical to the first structural core.

7. The assembly of claim 6, wherein the second structural core is technically identical to the first structural core.

8. The assembly of claim 1, wherein:

the assembly comprises a first backrest and a second backrest, the first backrest comprises the first frame and the first suspension system, the second backrest comprises the second frame and the second suspension system, the first structural core extends along the first elevation direction between a first upper structural end and a first lower structural end, the first structural core is attached to the first frame at the first upper structural end and the first lower structural end, and the second structural core extends along the second elevation direction between a second upper structural end and a second lower structural end, the second structural core is attached to the second frame at the second upper structural end and the second lower structural end.

* * * * *